(12) United States Patent
Lee et al.

(10) Patent No.: US 10,751,942 B2
(45) Date of Patent: Aug. 25, 2020

(54) THREE-DIMENSIONAL PRINTING DEVICE

(71) Applicants: XYZprinting, Inc., New Taipei (TW); Kinpo Electronics, Inc., New Taipei (TW)

(72) Inventors: Wei-Hua Lee, New Taipei (TW); Yu-Hsien Syu, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 471 days.

(21) Appl. No.: 15/641,341

(22) Filed: Jul. 5, 2017

(65) Prior Publication Data
US 2018/0333917 A1    Nov. 22, 2018

(30) Foreign Application Priority Data
May 22, 2017    (CN) .......................... 2017 1 0362266

(51) Int. Cl.
| B29C 64/264 | (2017.01) |
| G02B 9/64 | (2006.01) |
| G03B 21/134 | (2006.01) |
| G02B 13/16 | (2006.01) |

(Continued)

(52) U.S. Cl.
CPC .......... B29C 64/264 (2017.08); B29C 64/129 (2017.08); B33Y 30/00 (2014.12); G02B 13/16 (2013.01); G03B 21/134 (2013.01); G02B 9/64 (2013.01)

(58) Field of Classification Search
CPC ..... B29C 64/264; B29C 64/129; B33Y 30/00; G02B 13/16; G03B 21/134; B02B 9/64
See application file for complete search history.

(56) References Cited

U.S. PATENT DOCUMENTS

| 8,985,989 | B2 * | 3/2015 | Wu | ...................... B29C 67/0059 |
| | | | | 425/174.4 |
| 2013/0295215 | A1 * | 11/2013 | Wu | ...................... B29C 64/112 |
| | | | | 425/174.4 |

(Continued)

FOREIGN PATENT DOCUMENTS

| CN | 104669621 | 6/2015 |
| CN | 106363908 | 2/2017 |

OTHER PUBLICATIONS

Han, Jun et al., "Engineering Optics," with English translation thereof, National Defense Industry Press, Feb. 1, 2016, pp. 1-8.
(Continued)

*Primary Examiner* — Nahida Sultana
(74) *Attorney, Agent, or Firm* — JCIPRNET

(57) ABSTRACT

The disclosure provides a three-dimensional (3D) printing device including a tank, a forming stage and an irradiation unit. The tank is filled with a liquid forming material. The forming stage is movably disposed at the tank. The irradiation unit is disposed beside the tank and includes an image source and a projecting lens. The image source is used to emit an image beam. The image beam passes through the projecting lens to irradiate and cure the liquid forming material. An entrance pupil position of the projecting lens is ENP and 2000 mm≤ENP≤15000 mm. An exit pupil position of the projecting lens is EXP and 2000 mm≤|EXP|≤15000 mm.

9 Claims, 7 Drawing Sheets

(51) Int. Cl.
   *B33Y 30/00*        (2015.01)
   *B29C 64/129*       (2017.01)

(56) References Cited

U.S. PATENT DOCUMENTS

2014/0355127 A1*  12/2014  Nagahara ............ G02B 15/177
                                                        359/649
2018/0246302 A1*   8/2018  Minefuji ................ G02B 13/16
2019/0154975 A1*   5/2019  Huang .................... G02B 9/10
2019/0299525 A1*  10/2019  Lee ........................... G02F 1/13

OTHER PUBLICATIONS

Wang, Weinong et al., "Introductory technology of image measuring instrument," with English translation thereof, China Business Press, Feb. 2010, pp. 1-11.

Wu, Qihai et al., "Comprehensive guide to switchable lens of digital cameras," with English translation thereof, Zhejiang Photography Press, Jan. 2015, pp. 1-8.

Mei, Danyang et al., "Design of telecentric beam path for zoom projection optics," Journal of Applied Optics, vol. 27, Issue 4, Jul. 2012, pp. 264-267.

"Office Action of China Counterpart Application", dated Mar. 2, 2020, p. 1-p. 8.

* cited by examiner

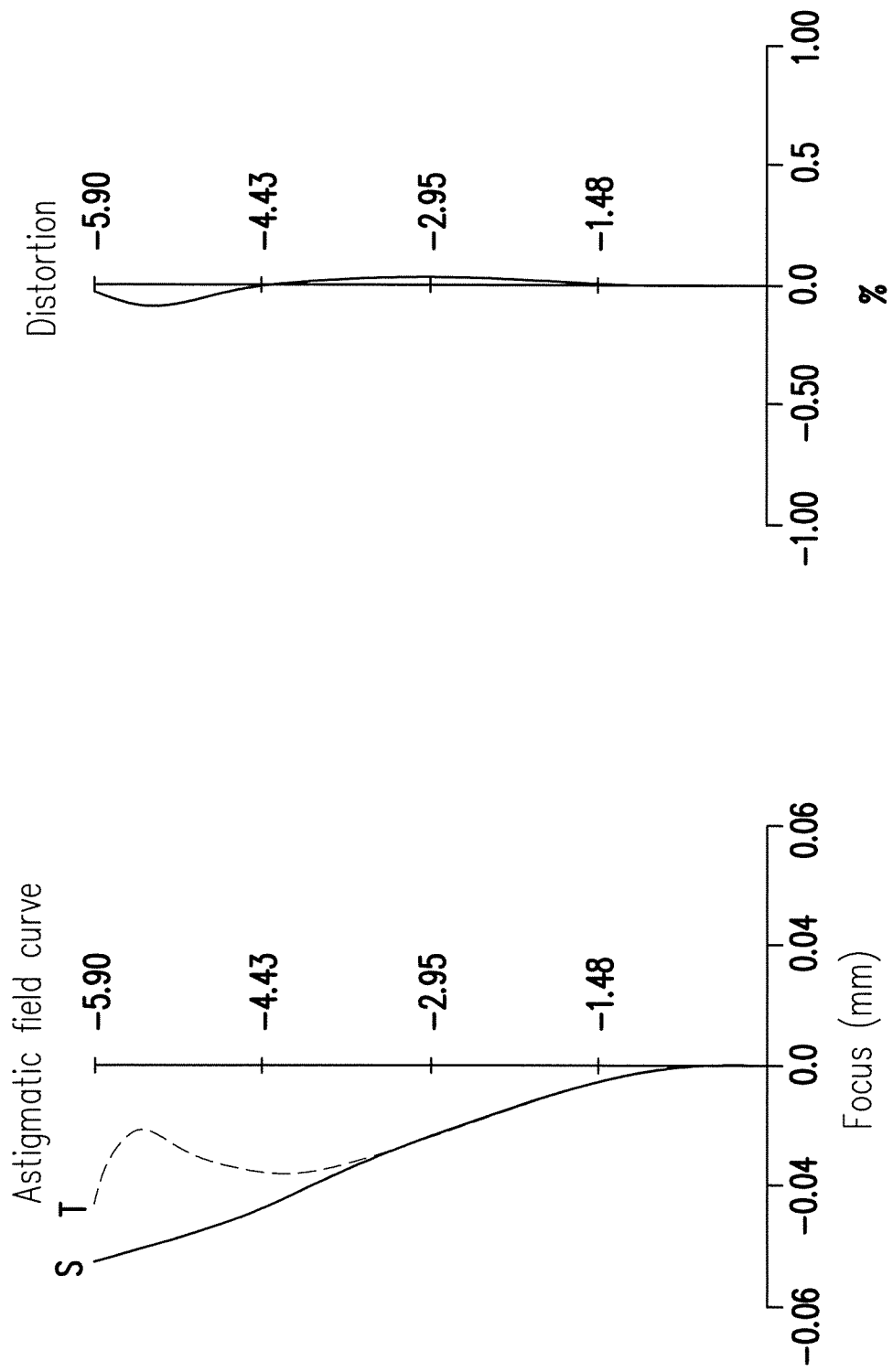

| Optical member | Surface | Surface type | Radius of curvature (mm) | Thickness (mm) | Glass type | Full aperture (mm) |
|---|---|---|---|---|---|---|
| | Imaging surface 0 | | ∞ | 135.3100 | | 89.9400 |
| Eighth lens 8 | Image side surface 82 | spherical surface | 133.4700 | 21.4200 | SF4_SCHOT | 90.7100 |
| | Object side surface 81 | spherical surface | -133.4700 | 10.7400 | | 89.1600 |
| Seventh lens 7 | Image side surface 72 | spherical surface | -86.8500 | 5.0000 | LF5_SCHOT | 74.8500 |
| | Object side surface 71 | spherical surface | -178.3500 | 2.0000 | | 72.2500 |
| Sixth lens 6 | Image side surface 62 | spherical surface | 60.0000 | 11.6800 | NFK5_SCHO | 61.7000 |
| | Object side surface 61 | spherical surface | 100.2400 | 12.3000 | | 55.4700 |
| Fifth lens 5 | Image side surface 52 | spherical surface | 27.0800 | 8.1000 | SF4_SCHOT | 38.2700 |
| | Object side surface 51 | spherical surface | 21.5900 | 20.0000 | | 29.6100 |
| Fourth lens 4 | Image side surface 42 | spherical surface | 10.7500 | 4.8000 | NSF2_SCHO | 11.8100 |
| | Object side surface 41 | spherical surface | 5.4000 | 3.1700 | | 6.7600 |
| Aperture stop AS | | | ∞ | 6.0300 | | 4.8800 |
| Third lens 3 | Image side surface 32 | spherical surface | -10.9200 | 4.8000 | NSF2_SCHO | 11.2800 |
| | Object side surface 31 | spherical surface | -9.3800 | 0.5600 | | 14.8900 |
| Second lens 2 | Image side surface 22 | spherical surface | 132.9500 | 4.0200 | NSF2_SCHO | 18.1600 |
| | Object side surface 21 | spherical surface | -26.7500 | 0.5000 | | 18.8600 |
| First lens 1 | Image side surface 12 | spherical surface | 18.0000 | 4.3900 | BK7_SCHOT | 19.2800 |
| | Object side surface 11 | spherical surface | 103.1800 | 2.0000 | | 18.5300 |
| TIR prism 136 | Image side surface 136-2 | | ∞ | 16.5000 | BK7_SCHOT | 17.7200 |
| | Object side surface 136-1 | | ∞ | 1.0000 | | 12.6200 |
| Protective plate 138 | Image side surface 138-2 | | ∞ | 0.6500 | BK7_SCHOT | 12.1400 |
| | Object side surface 138-1 | | ∞ | 0.3000 | | 11.9400 |
| Image source 132 | | | ∞ | 0.0000 | | 11.8100 |

FIG. 8

THREE-DIMENSIONAL PRINTING DEVICE

CROSS-REFERENCE TO RELATED APPLICATION

This application claims the priority benefit of China application serial no. 201710362266.4, filed on May 22, 2017. The entirety of the above-mentioned patent application is hereby incorporated by reference herein and made a part of this specification.

BACKGROUND

Technical Field

The disclosure relates to a printing device and particularly relates to a three-dimensional printing device.

Description of Related Art

In recent years, with the progress of technology, many different ways of using additive manufacturing technology such as layer-by-layer model construction to construct a physical three-dimensional (3D) model have been proposed. Generally, the additive manufacturing technology converts design data of a 3D model constructed using software such as computer aided design (CAD) to a plurality of thin (quasi-two-dimensional) cross-sectional layers that are stacked continuously. In the meanwhile, many technical means capable of forming a plurality of thin cross-sectional layers have also been gradually proposed. For instance, a printing module of a printing device can generally move above a substrate along an XY plane according to spatial coordinates XYZ constructed based on the design data of the 3D model, such that a construction material can form a correct cross-sectional layer shape. The deposited construction material can then be naturally hardened or be cured by heating or by irradiation from a light source, thus forming the desired cross-sectional layers. Thus, by the printing module moving along a Z-axis direction layer by layer, a plurality of cross-sectional layers can be gradually stacked along the Z-axis, so that the construction material can form a 3D printing object when being cured layer by layer.

Taking a technique of forming a 3D printing object by curing a construction material by an irradiation unit as an example, a printing module is adapted to be dipped in a liquid forming material filled in a tank and the irradiation unit irradiates the liquid forming material as the construction material on an XY plane to cure and stack the liquid forming material on a forming stage of the printing module. In this way, by the forming stage of the printing module moving along the Z-axis direction layer by layer, the liquid forming material can be cured layer by layer and be stacked into the 3D printing object. However, a size of an image projected by the irradiation unit is likely to be affected by distance tolerance between an imaging surface and the irradiation unit, which is unfavorable for quality of the 3D printing object.

SUMMARY

The disclosure is directed to a three-dimensional printing device which prints a good-quality 3D printing object.

According to embodiments of the disclosure, the three-dimensional printing device includes a tank, a forming stage and an irradiation unit. The tank is filled with a liquid forming material. The forming stage is movably disposed in the tank. The irradiation unit is disposed beside the tank and includes an image source and a projecting lens. The image source is used to emit an image beam. The image beam passes through the projecting lens to irradiate and cure the liquid forming material. An entrance pupil position of the projecting lens is ENP and 2000 mm≤ENP≤15000 mm. An exit pupil position of the projecting lens is EXP and 2000 mm≤|EXP|≤15000 mm.

Based on the above, an entrance pupil position of the projecting lens of an embodiment of the disclosure is ENP, and 2000 mm≤ENP≤15000 mm. An exit pupil position of the projecting lens is EXP, and 2000 mm≤|EXP|≤15000 mm. A size of an image projected by the projecting lens dose not tend to be changed with a distance tolerance between an imaging surface and the projecting lens, which benefit the quality of the 3D printing object.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4 illustrates astigmatic field curves of a projecting lens according to an embodiment of the disclosure.

FIG. 5 illustrates distortion of a projecting lens according to an embodiment of the disclosure.

FIG. 8 illustrates detailed optical data of a projecting lens of the three-dimensional printing device according to an embodiment of the disclosure.

DESCRIPTION OF EMBODIMENTS

Figure 1:
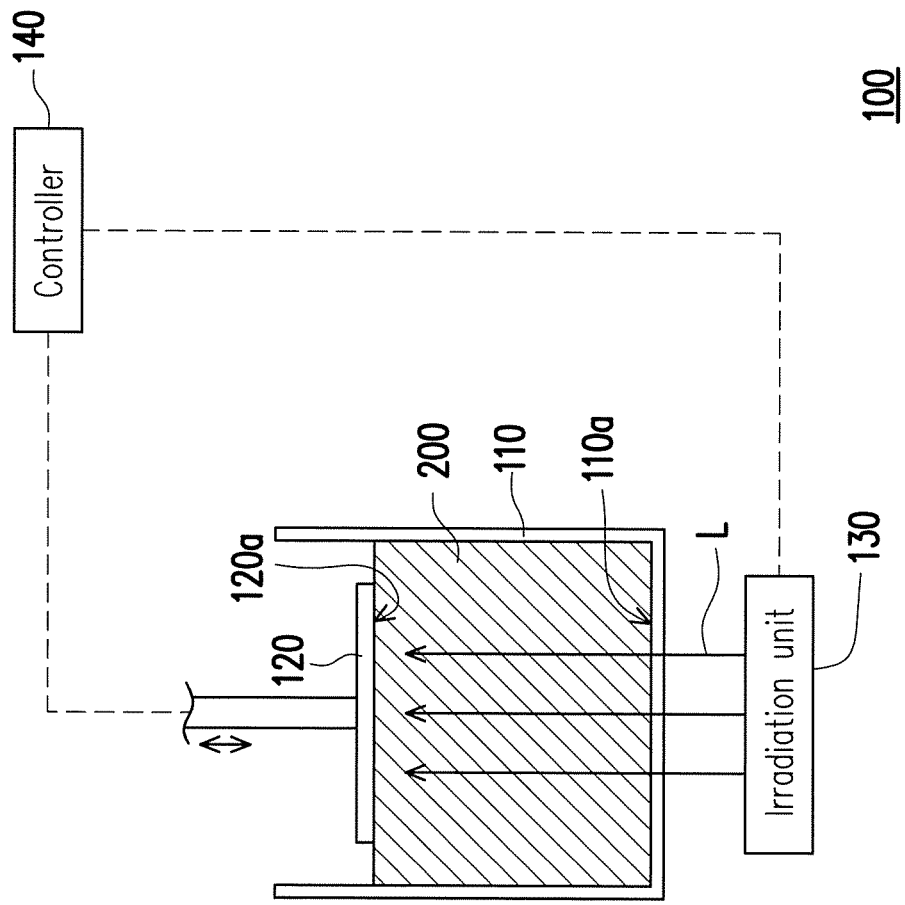
FIG. 1 is a schematic view of a three-dimensional printing device according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a schematic view of a three-dimensional printing device according to an embodiment of the disclosure. Cartesian coordinates X-Y-Z are provided in FIG. 1 for easy description. Referring to FIG. 1, in this embodiment, a three-dimensional printing device 100 is, for example, a stereo lithography (SL) device. The three-dimensional printing device 100 includes a tank 110, a forming stage 120 and an irradiation unit 130. The tank 110 is filled with a liquid forming material 200. The forming stage 120 is movably disposed in the tank 110 and has a carrying surface 120a facing the irradiation unit 130. For instance, the forming stage 120 may move along a Z-axis direction with respect to the tank 110 on an XY plane, and may be dipped into the liquid forming material 200. The irradiation unit 130 is disposed beside the tank 110 and is used to emit an image beam L. The image beam L irradiates the liquid forming material 200 to cure the liquid forming material 200 layer by layer so as to further form a three-dimensional printing object. More specifically, in this embodiment, the three-dimensional printing device 100 further includes a controller 140. The controller 140 may control the forming stage 120 to move along the Z-axis direction. Accordingly, the forming stage 120 can be moved out of or into the tank 110 and be dipped in the liquid forming material 200. During 3D printing, the forming stage 120 is controlled by the controller 140 to be dipped into the liquid forming material 200, and is maintained at a distance from an inner bottom 110a of the tank 110. At this moment, the irradiation unit 130 is controlled by the controller 140 to emit the image beam L so as to irradiate and cure the liquid forming material 200 between the forming stage 120 and the inner bottom 110a of the tank 110, thus forming the liquid forming material 200 into a cured layer. Then, as the forming stage 120 is controlled by the controller 140 to become gradually away from the inner bottom 110a of the tank 110, with the irradiation unit 130 irradiating the liquid forming material 200 between the cured layer and the inner bottom 110a, a multilayer stacked cured layer can be gradually formed on the forming stage 120. After the forming stage 120 is moved away from the liquid forming material 200 in the tank 110, a three-dimensional printing object obtained by stacking multiple cured layers is completed.

Figure 2:
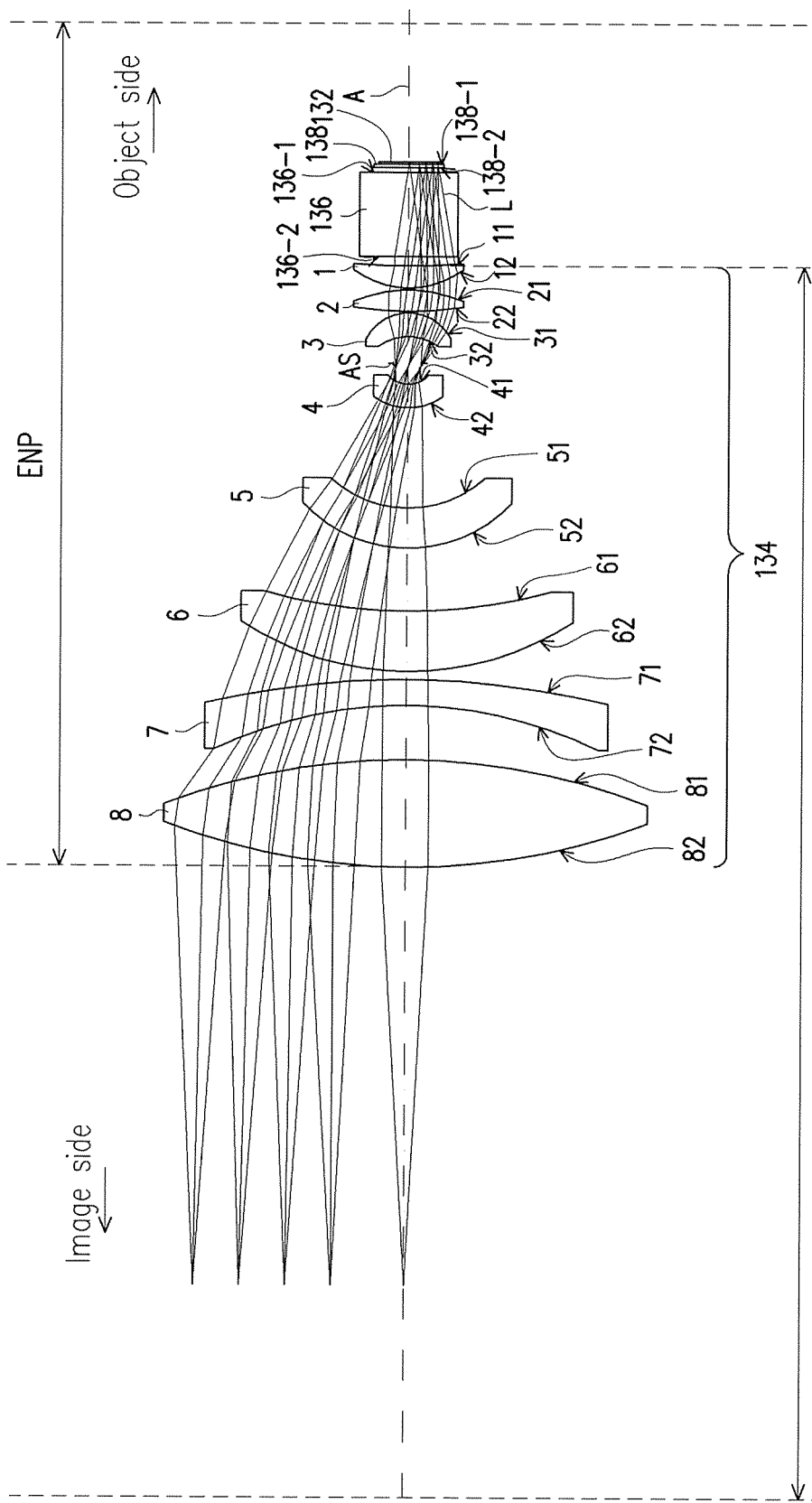
FIG. 2 is a schematic view of an irradiation unit according to an embodiment of the disclosure.

FIG. 2 is a schematic view of an irradiation unit according to an embodiment of the disclosure. Referring to FIG. 1 and FIG. 2, the irradiation unit 130 includes an image source 132 for emitting the image beam L. In this embodiment, the image source 132 is, for example, a digital micromirror device (DMD) or a display panel, but the disclosure is not limited thereto. The irradiation unit 130 further includes a projecting lens 134. The projecting lens 134 is disposed on a transmitting path of the image beam L and between the liquid forming material 200 and the image source 132. The image beam L passes through the projecting lens 134 to irradiate and cure the liquid forming material 200 to further stack the three-dimensional printing object. For the projecting lens 134, the side where the image source 132 is located is called an object side and the side where the liquid forming material 200 is located is called an image side. In this embodiment, an image (namely, an entrance pupil) of an aperture stop AS viewed from the object side through a member (e.g., a fourth lens 4 to an eighth lens 8) disposed before the aperture stop AS falls at an extremely distant position. In other words, the projecting lens 134 is a like telecentric lens, and the image beam L emitted from the projecting lens 134 is nearly parallel to an optical axis A of the projecting lens 134. Accordingly, an imaging size and a resolution of the image beam L on the carrying surface 120a (or the formed cured layer) of the forming stage 120 are less likely to be affected by distance tolerance between the carrying surface 120a (or the formed cured layer) and the projecting lens 134 so that a good-quality 3D printing object can be formed.

For instance, in this embodiment, an entrance pupil position of the projecting lens 134 is ENP, and 2000 mm≤ENP≤15000 mm. The entrance pupil position ENP refers to a distance from an intersection point of the first surface (e.g., an image side surface 82 of the eighth lens 8) of the projecting lens 134 counted from the image side and the optical axis A to an intersection point of a plane where the entrance pupil is located and the optical axis A. An exit pupil position of the projecting lens 134 is EXP, and 2000 mm≤|EXP|≤15000 mm. The exit pupil position EXP refers to a distance from an intersection point of the first surface (e.g., an object side surface 11 of a first lens 1) of the projecting lens 134 counted from the object side and the optical axis A to an intersection point of a plane where the exit pupil is located and the optical axis A. By designing the entrance pupil position and exit pupil position of the projecting lens 134 to be within an appropriate range, imaging characteristics of the projecting lens 134 become similar to those of a telecentric lens, which facilitates printing of a good-quality 3D printing object. More specifically, in this embodiment, an effective focal length of the projecting lens 134 is EFL, and 320 mm≤EFL≤2270 mm. The projecting lens 134 has an f-number F/#, and 1.5≤F/#≤5.6. By designing at least one of the effective focal length and the f-number of the projecting lens 134 to be within an appropriate range, the projecting lens 134 becomes particularly suitable for applying to the actual three-dimensional printing device 100.

Referring to FIG. 2, in this embodiment, the projecting lens 134 includes the first lens 1, a second lens 2, a third lens 3, the fourth lens 4, a fifth lens 5, a sixth lens 6, a seventh lens 7 and the eighth lens 8 in sequence from the object side to the image side. The first lens 1 to the eighth lens 8 respectively have object side surfaces 11, 21, 31, 41, 51, 61, 71 and 81 facing the object side and allowing passage of the image beam L therethrough and image side surfaces 12, 22, 32, 42, 52, 62, 72 and 82 facing the image side and allowing passage of the image beam L therethrough. The object side surface 11 and the image side surface 12 of the first lens 1 are respectively a concave surface and a convex surface. The object side surface 21 and the image side surface 22 of the second lens 2 are both convex surfaces. The object side surface 31 and the image side surface 32 of the third lens 3 are respectively a convex surface and a concave surface. The object side surface 41 and the image side surface 42 of the fourth lens 4 are respectively a concave surface and a convex surface. The object side surface 51 and the image side surface 52 of the fifth lens 5 are respectively a concave surface and a convex surface. The object side surface 61 and the image side surface 62 of the sixth lens 6 are respectively a concave surface and a convex surface. The object side surface 71 and the image side surface 72 of the seventh lens 7 are respectively a convex surface and a concave surface. The object side surface 81 and the image side surface 82 of the eighth lens 8 are both convex surfaces. It should be mentioned that the number of the lenses of the projecting lens 134 and the shape of each of the lenses are described to illustrate rather than limit the disclosure. In other embodiments, the number of the lenses of the projecting lens 134 and the shape of each of the lenses may be designed in other appropriate manners.

Further, in this embodiment, in order to enable the image beam L to sufficiently irradiate the liquid forming material 200 on the carrying surface 120a (or the formed cured layer) of the forming stage 120 in a nearly parallel manner, a forming area A1 in the projecting lens 134 closest to the forming stage 120 is large and near an area A2 of the carrying surface 120a. For example, 0.142≤A1/A2≤1. In other words, compared to general telecentric lenses (e.g., telescopes) for observation, an area of the lens (e.g., the eighth lens 8) closest to the forming stage 120 in the projecting lens 134 is particularly large. In addition, in this embodiment, the irradiation unit 130 may also optionally include a total internal reflection (TIR) prism 136 disposed between the image source 132 and the projecting lens 134 and a transmissive protective plate 138 disposed between the TIR prism 136 and the image source 132. The TIR prism 136 has an object side surface 136-1 facing the object side and an image side surface 136-2 facing the image side, and the protective plate 138 has an object side surface 138-1 facing the object side and an image side surface 138-2 facing the image side. However, the disclosure is not limited thereto. In other embodiments, the irradiation unit 130 may also not include the TIR prism 136 and/or the protective plate 138.

Figure 3:
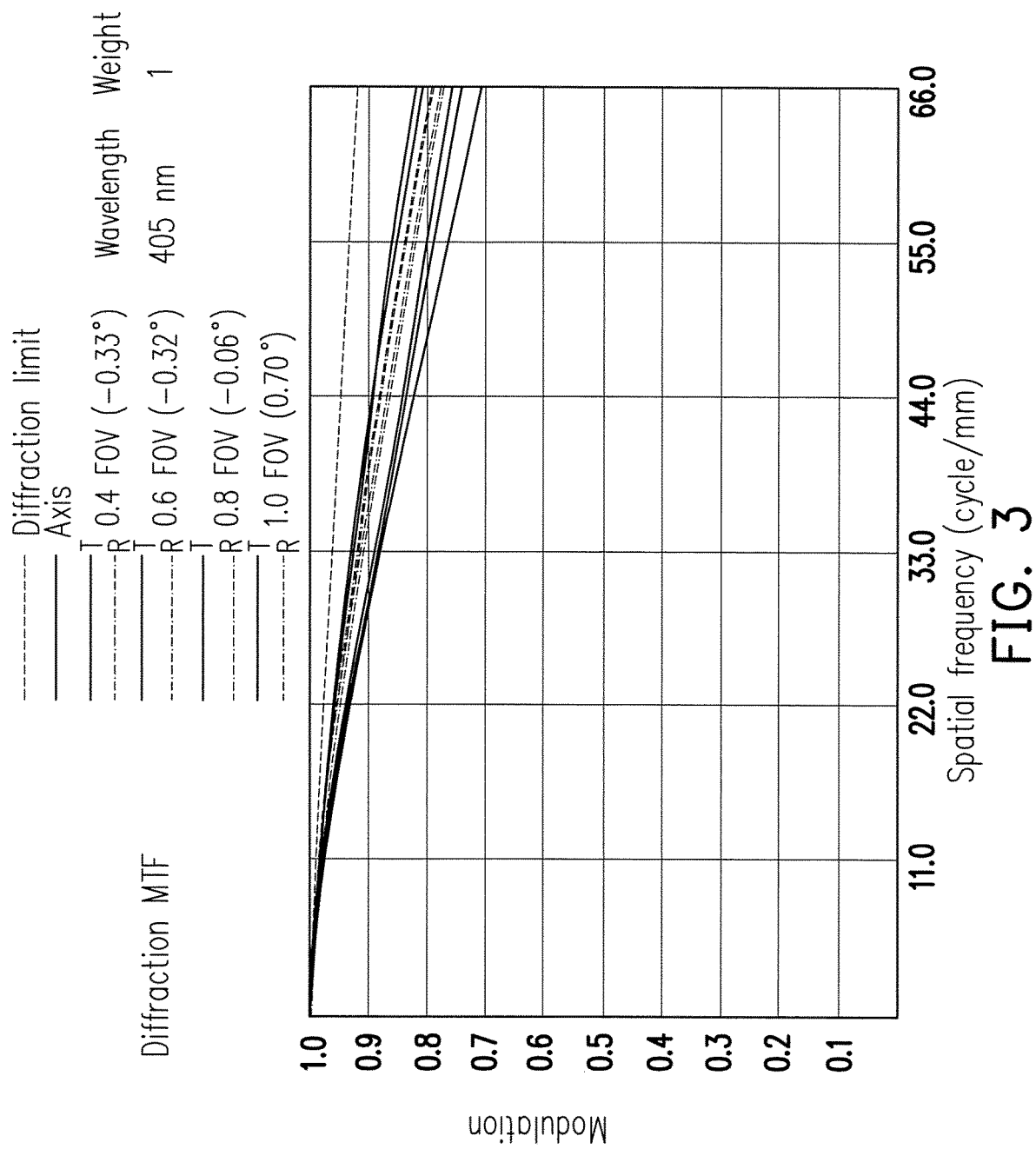
FIG. 3 is a modulation transfer function (MTF) graph of a projecting lens according to an embodiment of the disclosure.
Figure 6:
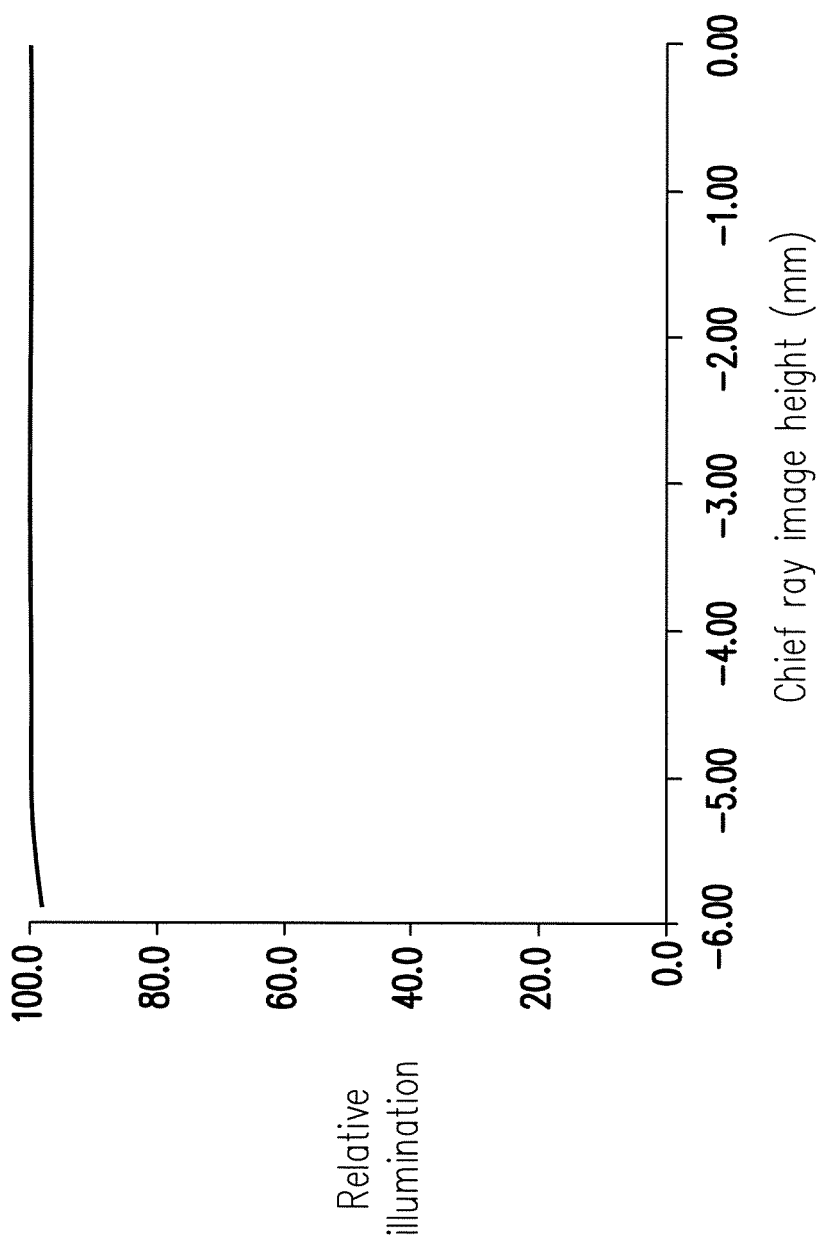
FIG. 6 illustrates relative illumination of an image formed by a projecting lens according to an embodiment of the disclosure.
Figure 7:
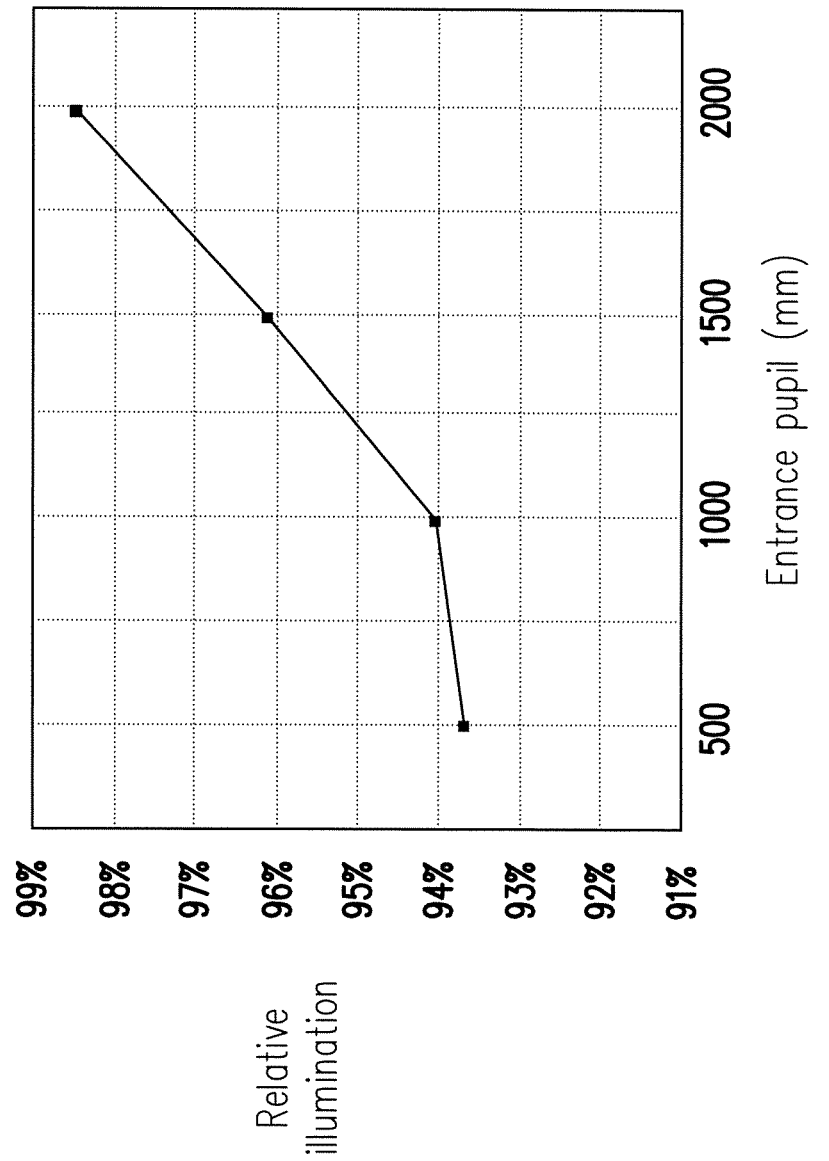
FIG. 7 illustrates a relationship between an entrance pupil position of a projecting lens and relative illumination of an image projected by the projecting lens according to an embodiment of the disclosure.

FIG. 3 is a modulation transfer function (MTF) graph of a projecting lens according to an embodiment of the disclosure. From FIG. 3 it is evident that an image projected by the projecting lens 134 has a high resolution. FIG. 4 illustrates astigmatic field curves of a projecting lens according to an embodiment of the disclosure. A curve S of FIG. 4 represents the astigmatic field curve in a sagittal direction, and a curve T of FIG. 4 represents the astigmatic field curve in a tangential direction. From FIG. 4 it is evident that the astigmatic field curves of the image projected by the projecting lens 134 are small. FIG. 5 illustrates optical distortion of a projecting lens according to an embodiment of the disclosure. From FIG. 5 it is evident that distortion of the image projected by the projecting lens 134 is small and has a value always less than 0.5%. FIG. 6 illustrates relative illumination of an image formed by a projecting lens according to an embodiment of the disclosure. From FIG. 6 it is evident that the image projected by the projecting lens 134 has high relative illumination, the relative illumination of the image being greater than 90%. FIG. 7 illustrates a relationship between an entrance pupil position of a projecting lens and relative illumination of an image projected by the projecting lens according to an embodiment of the disclosure. From FIG. 7 it is evident that when the entrance pupil position of the projecting lens 134 is more than or equal to 2000 mm, the image projected by the projecting lens 134 has high relative illumination and energy loss does not easily occur in the irradiation unit 130. Moreover, FIG. 8 illustrates detailed optical data of a projecting lens of the three-dimensional printing device according to an embodiment of the disclosure.

To sum up, the three-dimensional printing device according to an embodiment of the disclosure projects the image beam to the liquid forming material by using the telecentric lens-like projecting lens to form a cured layer having a specified pattern so as to further stack the 3D printing object. The image beam emitted from the telecentric lens-like projecting lens is nearly parallel to the optical axis of the projecting lens. Accordingly, the imaging size and the resolution of the image beam on the carrying surface (or the formed cured layer) of the forming stage are less likely to be affected by distance tolerance between the carrying surface (or the formed cured layer) and the projecting lens so that a good-quality 3D printing object can be formed.

Finally, it should be noted that the foregoing embodiments are only used to explain, but not to limit the technical solutions of the disclosure. Although the disclosure has been described in detail with reference to the foregoing embodiments, persons of ordinary skill in the art should understand that they can still make modifications to the technical solutions described in the foregoing embodiments, or make equivalent substitutions to some or all technical features thereof, and such modifications or substitutions cannot make the essence of the corresponding technical solutions depart from the scope of the technical solutions of the embodiments of the disclosure.

What is claimed is:

1. A three-dimensional printing device comprising:
a tank, filled with a liquid forming material;
a forming stage, movably disposed in the tank; and
an irradiation unit, disposed beside the tank and comprising:
an image source for emitting an image beam; and
a projecting lens, through which the image beam passes to irradiate and cure the liquid forming material, wherein the projecting lens has an optical axis and comprises a plurality of lenses in sequence from an object side to an image side, each of the lenses having an object side surface facing the object side and an image side surface facing the image side, the projecting lens has an entrance pupil, an entrance pupil position of the projecting lens is ENP and refers to a distance from an intersection point of the image side surface of a first lens of the plurality of lenses of the projecting lens counted from the image side and the optical axis to an intersection point of a plane where the entrance pupil is located and the optical axis, and 2000 mm≤ENP≤15000 mm; and the projecting lens has an exit pupil, an exit pupil position of the projecting lens is EXP and refers to a distance from an intersection point of the object side surface of a first lens of the plurality of lenses of the projecting lens counted from the object side and the optical axis to an intersection point of a plane where the exit pupil is located and the optical axis, and 2000 mm≤|EXP|≤15000 mm.

2. The three-dimensional printing device according to claim 1, wherein an effective focal length of the projecting lens is EFL, and 320 mm≤EFL≤2270 mm.

3. The three-dimensional printing device according to claim 1, wherein the projecting lens has an f-number F/#, and 1.5≤F/#≤5.6.

4. The three-dimensional printing device according to claim 1, wherein the projecting lens has the optical axis and comprises the first lens of the plurality of lenses of the projecting lens counted from the object side, a second lens, a third lens, a fourth lens, a fifth lens, a sixth lens, a seventh lens and an eighth lens in sequence from the object side to the image side, the eighth lens is the first lens of the plurality of lenses of the projecting lens counted from the image side, and each of the first lens of the plurality of lenses of the projecting lens counted from the object side to the eighth lens has the object side surface facing the object side and allowing passage of the image beam therethrough and the image side surface facing the image side and allowing passage of the image beam therethrough.

5. The three-dimensional printing device according to claim 4, wherein the object side surface and the image side surface of the first lens of the plurality of lenses of the projecting lens counted from the object side are respectively a concave surface and a convex surface, and the object side surface and the image side surface of the second lens are both convex surfaces.

6. The three-dimensional printing device according to claim 4, wherein the object side surface and the image side surface of the third lens are respectively a convex surface and a concave surface, and the object side surface and the image side surface of the fourth lens are respectively a concave surface and a convex surface.

7. The three-dimensional printing device according to claim 4, wherein the object side surface and the image side surface of the fifth lens are respectively a concave surface and a convex surface, and the object side surface and the image side surface of the sixth lens are respectively a concave surface and a convex surface.

8. The three-dimensional printing device according to claim 4, wherein the object side surface and the image side surface of the seventh lens are respectively a convex surface and a concave surface, and the object side surface and the image side surface of the eighth lens are both convex surfaces.

9. The three-dimensional printing device according to claim 1, wherein a forming area closest to the forming stage in the projecting lens is $A1$, the forming stage has a carrying surface facing the projecting lens, an area of the carrying surface is $A2$, and $0.14 \leq A1/A2 \leq 1$.

* * * * *